(12) United States Patent
Otagiri et al.

(10) Patent No.: US 11,018,602 B2
(45) Date of Patent: May 25, 2021

(54) POWER GENERATING ELEMENT AND POWER GENERATING DEVICE

(71) Applicants: Mizuki Otagiri, Kanagawa (JP);
Tsuneaki Kondoh, Kanagawa (JP);
Tomoaki Sugawara, Kanagawa (JP);
Yuko Arizumi, Kanagawa (JP);
Junichiro Natori, Kanagawa (JP);
Mayuka Araumi, Tokyo (JP);
Takahiro Imai, Tokyo (JP); Hideyuki Miyazawa, Kanagawa (JP); Makito Nakashima, Kanagawa (JP); Megumi Kitamura, Tokyo (JP)

(72) Inventors: Mizuki Otagiri, Kanagawa (JP);
Tsuneaki Kondoh, Kanagawa (JP);
Tomoaki Sugawara, Kanagawa (JP);
Yuko Arizumi, Kanagawa (JP);
Junichiro Natori, Kanagawa (JP);
Mayuka Araumi, Tokyo (JP);
Takahiro Imai, Tokyo (JP); Hideyuki Miyazawa, Kanagawa (JP); Makito Nakashima, Kanagawa (JP); Megumi Kitamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 15/401,617

(22) Filed: Jan. 9, 2017

(65) Prior Publication Data
US 2017/0214338 A1    Jul. 27, 2017

(30) Foreign Application Priority Data
Jan. 25, 2016   (JP) ............................. JP2016-011502

(51) Int. Cl.
*H02N 1/04* (2006.01)
(52) U.S. Cl.
CPC ..................................... *H02N 1/04* (2013.01)
(58) Field of Classification Search
CPC ...................................................... H02N 1/04
See application file for complete search history.

(56) References Cited

U.S. PATENT DOCUMENTS

2013/0328440 A1* 12/2013 Kornbluh ................. B64C 3/48
                                                                310/300
2014/0077297 A1*  3/2014 Koo ....................... H01L 29/786
                                                                257/347

(Continued)

FOREIGN PATENT DOCUMENTS

CN        103368452 A   * 10/2013
CN        103368452 A     10/2013

(Continued)

OTHER PUBLICATIONS

Partial European Search Report dated Jun. 9, 2017 in European Patent Application No. 17150959.9.

*Primary Examiner* — Jue Zhang
(74) *Attorney, Agent, or Firm* — Oblon, McClelland, Maier & Neustadt, L.L.P.

(57) ABSTRACT

A power generating element is provided. The power generating element includes a pair of electrodes, an intermediate layer being insulating, and a substrate being flexible. The intermediate layer is disposed between the electrodes. The substrate is configured to support the electrodes and the intermediate layer. When the substrate undergoes a deformation, the intermediate layer is separated from or pressed against one of the electrodes.

14 Claims, 12 Drawing Sheets

(56) References Cited

U.S. PATENT DOCUMENTS

| | | | |
|---|---|---|---|
| 2014/0292138 A1* | 10/2014 | Wang | H02N 1/04 |
| | | | 310/300 |
| 2015/0061460 A1 | 3/2015 | Bae et al. | |
| 2016/0276957 A1 | 9/2016 | Sugawara et al. | |
| 2016/0328066 A1 | 11/2016 | Kondoh et al. | |
| 2016/0336505 A1* | 11/2016 | Arizumi | H01L 41/113 |
| 2016/0341381 A1 | 11/2016 | Imai et al. | |
| 2016/0344309 A1 | 11/2016 | Otagiri et al. | |

FOREIGN PATENT DOCUMENTS

| | | |
|---|---|---|
| CN | 103780130 A | 5/2014 |
| CN | 104135186 A | 11/2014 |
| CN | 104921316 A | 9/2015 |
| CN | 105262365 A | 1/2016 |
| JP | 2015-198154 | 11/2015 |

\* cited by examiner

POWER GENERATING ELEMENT AND POWER GENERATING DEVICE

CROSS-REFERENCE TO RELATED APPLICATIONS

This patent application is based on and claims priority pursuant to 35 U.S.C. § 119(a) to Japanese Patent Application No. 2016-011502, filed on Jan. 25, 2016, in the Japan Patent Office, the entire disclosure of which is hereby incorporated by reference herein.

BACKGROUND

1. Technical Field

The present disclosure relates to a power generating element and a power generating device.

2. Description of the Related Art

There have been attempts to convert vibration energy into electric energy. Vibration energy is generally generated from vibrations caused by structural bodies (e.g., roads, bridges, buildings, and industrial machineries), moving bodies (e.g., automobiles, railroad cars, and aircraft), and human body movements, and from environmental vibrations (e.g., wave power, wind power).

A piezoelectric element is known from which electric power can be extracted with a relatively small force, such as a force generated by rubbing the element with a finger.

This piezoelectric element includes a piezoelectric unit in which a conductive fiber, a piezoelectric fiber, and another conductive fiber, in this order, are arranged on the approximately same plane. The piezoelectric fiber is a piezoelectric polymer such as polylactic acid.

While conventional power generating devices mainly use environmental vibrations as energy source, there are various energy sources other than environmental vibrations.

For example, bending or extending movements of the human arm or leg, that are non-oscillatory movements, can be energy sources. The above related-art piezoelectric element is not expected to generate a large amount of power when applied to wearable power generating devices that generate power using human body movements.

SUMMARY

In accordance with some embodiments of the present invention, power generating elements are provided.

According to one embodiment, the power generating element includes a pair of electrodes, an intermediate layer being insulating, and a substrate being flexible. The intermediate layer is disposed between the electrodes. The substrate is configured to support the electrodes and the intermediate layer. When the substrate undergoes a deformation, the intermediate layer is separated from or pressed against one of the electrodes.

According to another embodiment, the power generating element includes a substrate being flexible and a plurality of units. Each of the units includes an insulating member, a first electrode, a second electrode, and an intermediate layer being insulating. The insulating member is disposed along the substrate, with one end of the insulating member secured to the substrate. The first electrode is disposed on one surface of the insulating member. The second electrode is disposed on the other surface of the insulating member. The intermediate layer is disposed on the first electrode. When the substrate undergoes a deformation, the intermediate layer is separated from or pressed against the second electrode.

In accordance with some embodiments of the present invention, power generating devices are provided. According to one embodiment, the power generating device includes the above power generating element and an element driver configured to cause the substrate to deform as a moving body moves. According to another embodiment, the power generating device includes the above power generating device and a suspension member configured to cause the substrate to deform when receiving an external force.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
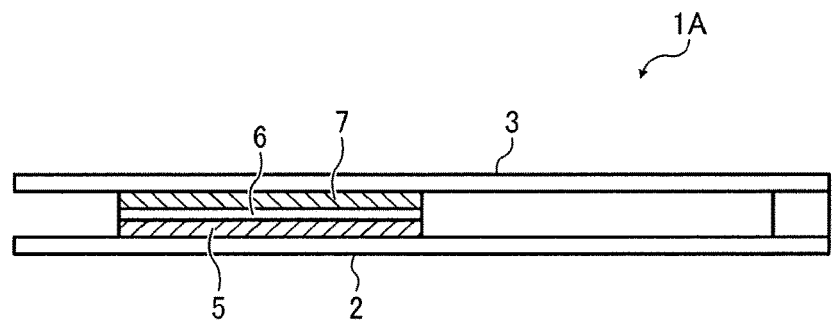
FIGS. 1A and 1B are side views of a power generating element according to a first embodiment of the present invention, in an undeformed state and a deformed state, respectively.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a power generating element is provided which can utilize non-oscillatory movements, including bending and stretching movements caused in the human body or environment, as power generating energy sources.

A first embodiment of the present invention is described below with reference to FIGS. 1A and 1B. Referring to FIG. 1A, a power generating element 1A includes a substrate 2 and an insulating member 3. The substrate 2 is in a planar shape and has flexibility. The insulating member 3 is in a planar shape. The insulating member 3 is disposed along the substrate 2 with one end thereof secured to the substrate 2 by means of bonding or welding.

To the upper surface of the substrate 2, a lower electrode 5 is secured. To a partial or entire surface of the lower electrode 5, an intermediate layer 6 having insulating property is bonded. To the lower surface of the insulating member 3 that is facing the substrate 2, an upper electrode 7 is secured corresponding to the area where the intermediate layer 6 is disposed.

The lower electrode 5 and the upper electrode 7 form an electrode pair. The intermediate layer 6 is disposed between the lower electrode 5 and the upper electrode 7.

The arrangements of the lower electrode 5, the intermediate layer 6, and the upper electrode 7 are defined relative to the substrate 2 and the insulating member 3, and are not limited to the above-described configuration.

Both the substrate 2 and the insulating member 3 may be made of PET (polyethylene terephthalate), but are not limited thereto. The substrate 2 and the insulating member 3 may be made of vinyl chloride, cloth, or paper.

The intermediate layer 6 includes a rubber and/or a rubber composition. One side (the upper electrode 7 side, in the present embodiment) of the intermediate layer 6 in the lamination direction has been subjected to a surface modification treatment and/or an inactivation treatment, such that the one side and the other side of the intermediate layer 6 deform to different degrees of deformation when the same deformation imparting force is applied thereto, and that the one side becomes capable of storing charge.

Figure 1B:
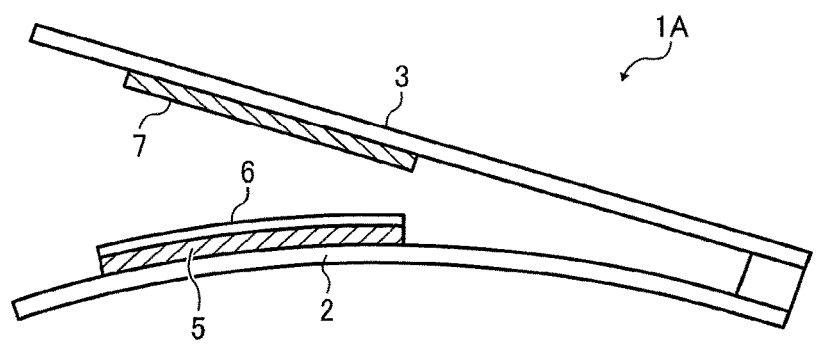

Referring to FIG. 1B, as the substrate 2 is deformed by an external force, the posture of the insulating member 3 rises up along a tangent line of the arc of the substrate 2. Thus, the intermediate layer 6 and the upper electrode 7 that have been in contact with or close to each other are separated from each other, and peeling charge occurs therebetween to store a charge. In addition, a change in capacitance is generated between the intermediate layer 6 and the upper electrode 7 to generate power. A change in capacitance is also generated when the substrate 2 returns to a previous state.

A second embodiment of the present invention is described below with reference to FIGS. 2 to 12. For the sake of simplicity, the same reference number will be given to identical constituent elements such as parts and materials having the same functions and redundant descriptions thereof omitted unless otherwise stated.

Figure 2:
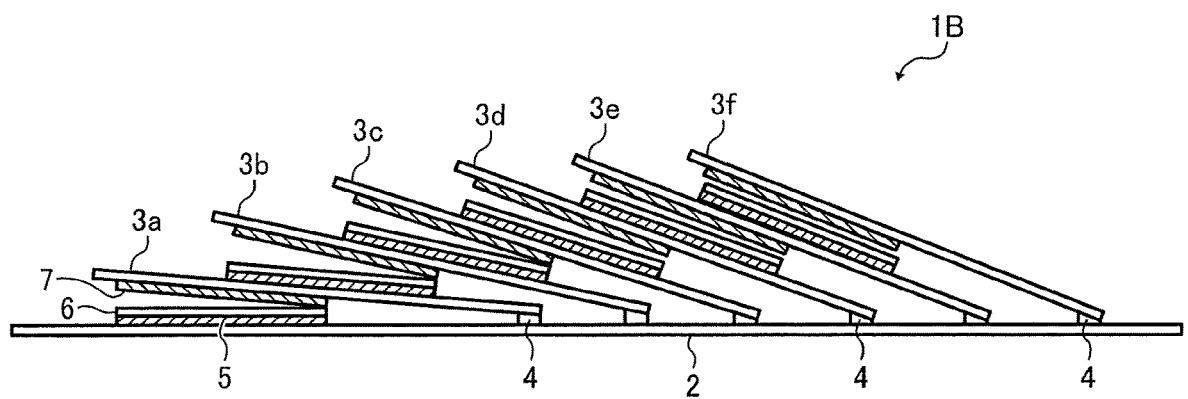
FIG. 2 is a side view of a power generating element according to a second embodiment of the present invention.

Referring to FIG. 2, a power generating element 1B includes a substrate 2 in a planar shape and multiple insulating members 3a, 3b, 3c, 3d, 3e, and 3f (hereinafter collectively referred to as "insulating members 3") each in a planar shape. One end of each of the insulating members 3 is secured to one surface of the substrate 2 in a cantilevered manner.

Both the substrate 2 and the insulating members 3 may be made of PET (polyethylene terephthalate) having a thickness of 100 μm, but are not limited thereto.

In the present embodiment, the number of insulating members 3 is six, but is not limited thereto.

Figure 3:
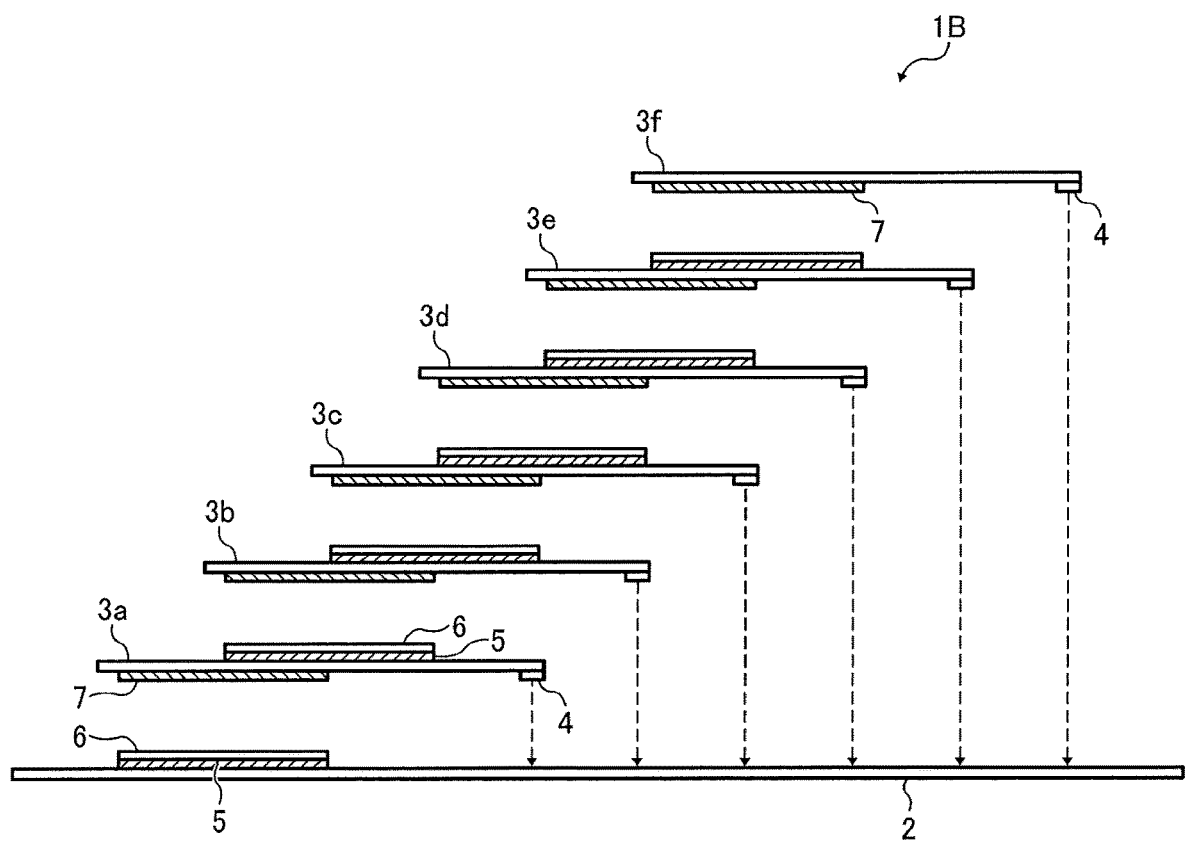
FIG. 3 is an exploded view of the power generating element according to the second embodiment.

Referring to FIGS. 2 and 3, one end of each of the insulating members 3a, 3b, 3c, 3d, 3e, and 3f is secured to the substrate 2 with a piece of double-sided adhesive tape 4 such that the insulating members 3a, 3b, 3c, 3d, 3e, and 3f are partially overlaid on one another in a longitudinal direction of the substrate 2. Alternatively, the insulating members 3 may be secured to the substrate 2 by means of welding.

Referring to a left side of FIG. 2, a combined structure of the lower electrode 5 and the intermediate layer 6 is disposed on the upper surface of the substrate 2. The upper electrode 7 is disposed on the lower surface of the insulating member 3a so as to face the intermediate layer 6.

On the upper surface of the insulating member 3a, another combined structure of the lower electrode 5 and the intermediate layer 6 is disposed. The insulating members 3a, 3b, 3c, 3d, and 3e serve as identical units having the same configuration in which the upper electrode 7 is disposed on the lower surface and the combined structure of the lower electrode 5 and the intermediate layer 6 is disposed on the upper surface. The insulating member 3f has a different configuration in which only the upper electrode 7 is disposed on the lower surface.

According to another embodiment, the insulating members 3a, 3b, 3c, 3d, and 3e may have the reversed configuration in which the upper electrode 7 is disposed on the upper surface and the combined structure of the lower electrode 5 and the intermediate layer 6 is disposed on the lower surface. In this case, the upper electrode 7 is disposed on the upper surface of the substrate 2, and the combined structure of the lower electrode 5 and the intermediate layer 6 is disposed on the lower surface of the insulating member 3f.

Figure 4:
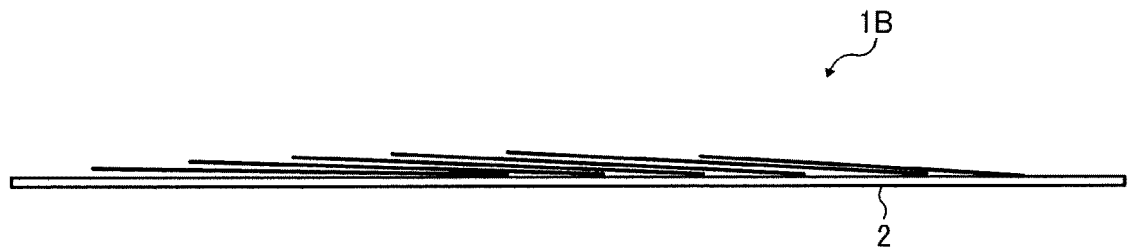
FIG. 4 is a side view of the power generating element according to the second embodiment.

The power generating element 1B illustrated in FIG. 2 looks bulky since the thickness of each component is drawn with exaggeration for the sake of clarity. In actual, each component of the power generating element 1B has a thickness in a micron order, and the power generating element 1B looks like a thin plate as illustrated in FIG. 4.

Figure 5:
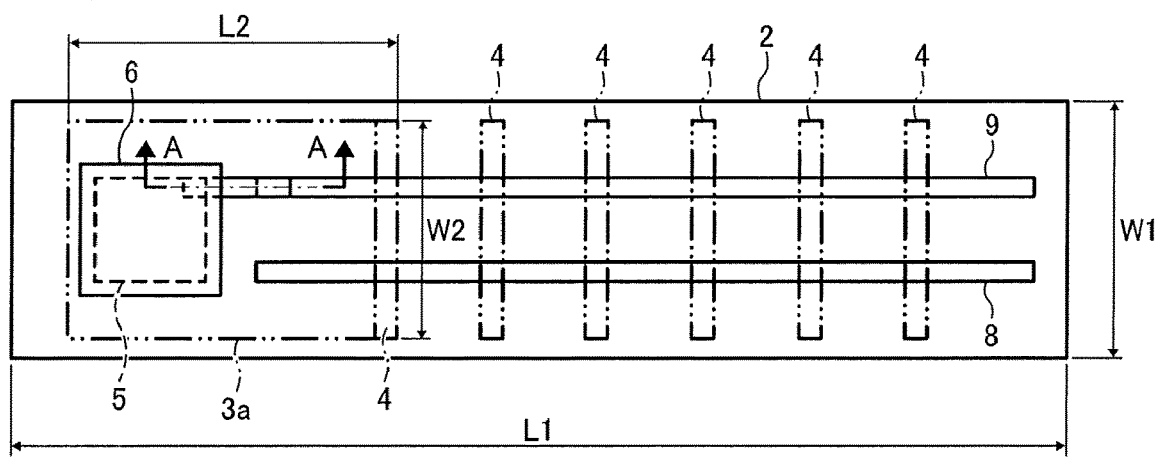
FIG. 5 is a plan view of the power generating element according to the second embodiment, illustrating an arrangement of insulating members on a substrate.

As illustrated in FIG. 5, the substrate 2 has a rectangular shape with a longitudinal length L1 of 210 mm and a width W1 of 50 mm.

Each of the insulating members 3 has a rectangular shape with a longitudinal length L2 of 50 mm and a width W2 of 40 mm. In FIG. 5, the insulating members 3 except for the insulating member 3a are omitted, while the positions of the insulating members 3 are indicated by the positions of the double-sided adhesive tape 4.

The lower electrode 5 is formed of a conductive cloth having a thickness of 30 μm in a square shape with each side having a length of 25 mm. The intermediate layer 6 is formed of a rubber (KE1353 available from Shin-Etsu Chemical Co., Ltd.) having a thickness of 110 μm in a square shape with each side having a length of 30 mm.

The upper electrode 7 is formed of a conductive cloth having a thickness of 110 μm in a square shape with each side having a length of 25 mm.

The intermediate layer 6 has a slightly larger area than both the lower electrode 5 and the upper electrode 7.

To each surface of the substrate 2 and the insulating members 3a, 3b, 3c, 3d, and 3e, the lower electrode 5 is secured with a piece of double-sided adhesive tape having a thickness of 90 μm in a square shape with each side having a length of 25 mm. The intermediate layer 6 is bonded to a partial or entire surface of the lower electrode 5.

With respect to each of the insulating members 3a, 3b, 3c, 3d, 3e, and 3f, the lower surface (that is supporting the upper electrode 7) of one end part thereof is secured to the substrate 2 with a piece of double-sided adhesive tape 4 having a width of 5 mm in a cantilevered manner.

On the upper surface of the substrate 2, a mainstream lead wire 8 for collecting electricity (charge) from the upper electrodes 7 and another mainstream lead wire 9 for collecting electricity (charge) from the lower electrodes 5 are disposed approximately in parallel with a longitudinal direction of the substrate 2.

Each of the mainstream lead wires 8 and 9 is formed of a conductive tape having a thickness of 36 μm and a width of 5 mm. The pieces of double-sided adhesive tape 4 for securing the insulating members 3 to the substrate 2 are attached to the surface of the substrate 2 from above the mainstream lead wires 8 and 9.

Figure 6:
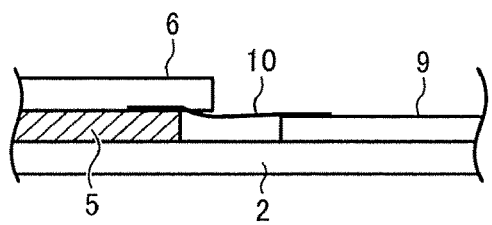
FIG. 6 is a cross-sectional view taken from line A-A of FIG. 5, illustrating a connection of a lower electrode with a mainstream lead wire.

As illustrated in FIG. 6, each lower electrode 5 is connected to the mainstream lead wire 9 via a tributary lead wire 10 formed of a conductive tape.

Figure 7:
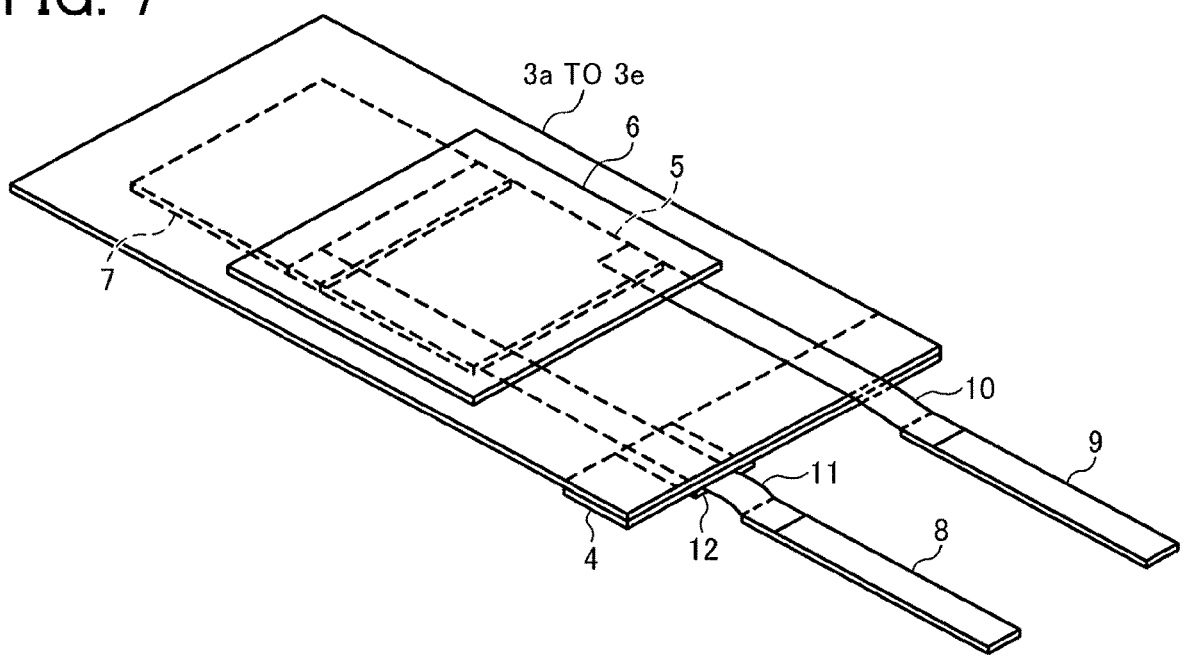
FIG. 7 is a perspective view of the power generating element according to the second embodiment, illustrating a connection of an upper electrode with a mainstream lead wire.

As illustrated in FIG. 7, each upper electrode 7 is connected to the mainstream lead wire 8 via a tributary lead wire 11 formed of a conductive tape. The tributary lead wire 10 is disposed above the insulating member 3 when connecting the lower electrode 5 to the mainstream lead wire 9. On the other hand, the tributary lead wire 11 (serving as an extracted part of the upper electrode 7) is overlapped with the piece of double-sided adhesive tape 4 when connecting the upper electrode 7 to the mainstream lead wire 8, while inhibiting the piece of double-sided adhesive tape 4 from securing the insulating member 3 to the substrate 2.

To avoid this problem, a piece of another double-sided adhesive tape 12 is disposed on a portion where the tributary lead wire 11 is overlapped with the piece of double-sided adhesive tape 4 so that the insulating member 3 is reliably secured to the substrate 2 thereby.

Figure 8:
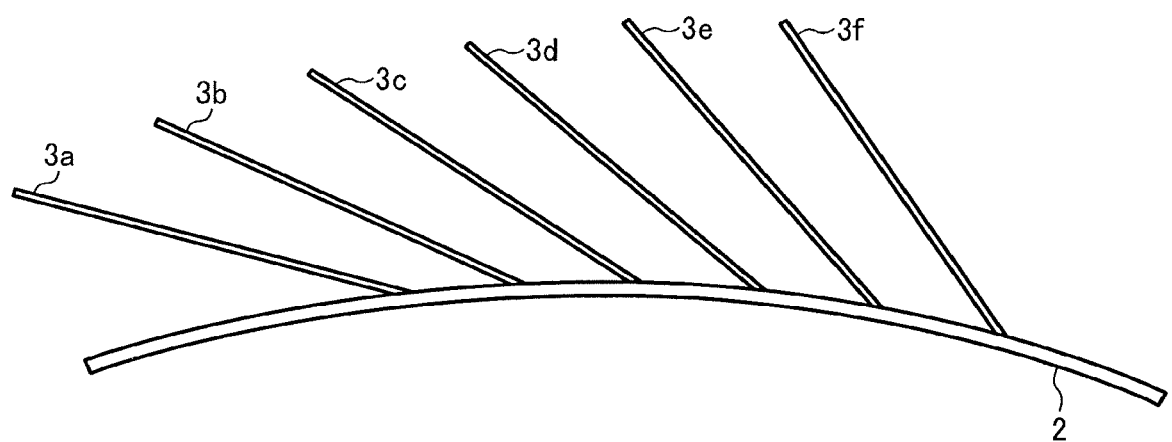
FIG. 8 is a schematic view of the power generating element according to the second embodiment, in a state in which a substrate is bent and insulating members has risen up.
Figure 9:
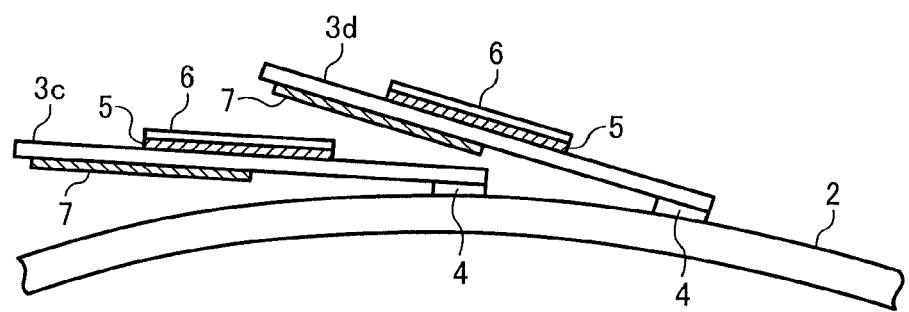
FIG. 9 is a partial magnified view of FIG. 8.

Referring to FIGS. 8 and 9, as the substrate 2 is deformed by an external force, the postures of the insulating members 3 rise up along a tangent line of the arc of the substrate 2. Thus, the intermediate layer 6 and the upper electrode 7 that have been in contact with or close to each other are separated from each other, and peeling charge occurs therebetween to store a charge. In addition, a change in capacitance is generated between the intermediate layer 6 and the upper electrode 7 to generate power. In FIG. 9, only the units including the respective insulating members 3c and 3d are illustrated.

A change in capacitance is also generated when the substrate 2 returns to a previous state.

Figure 10:
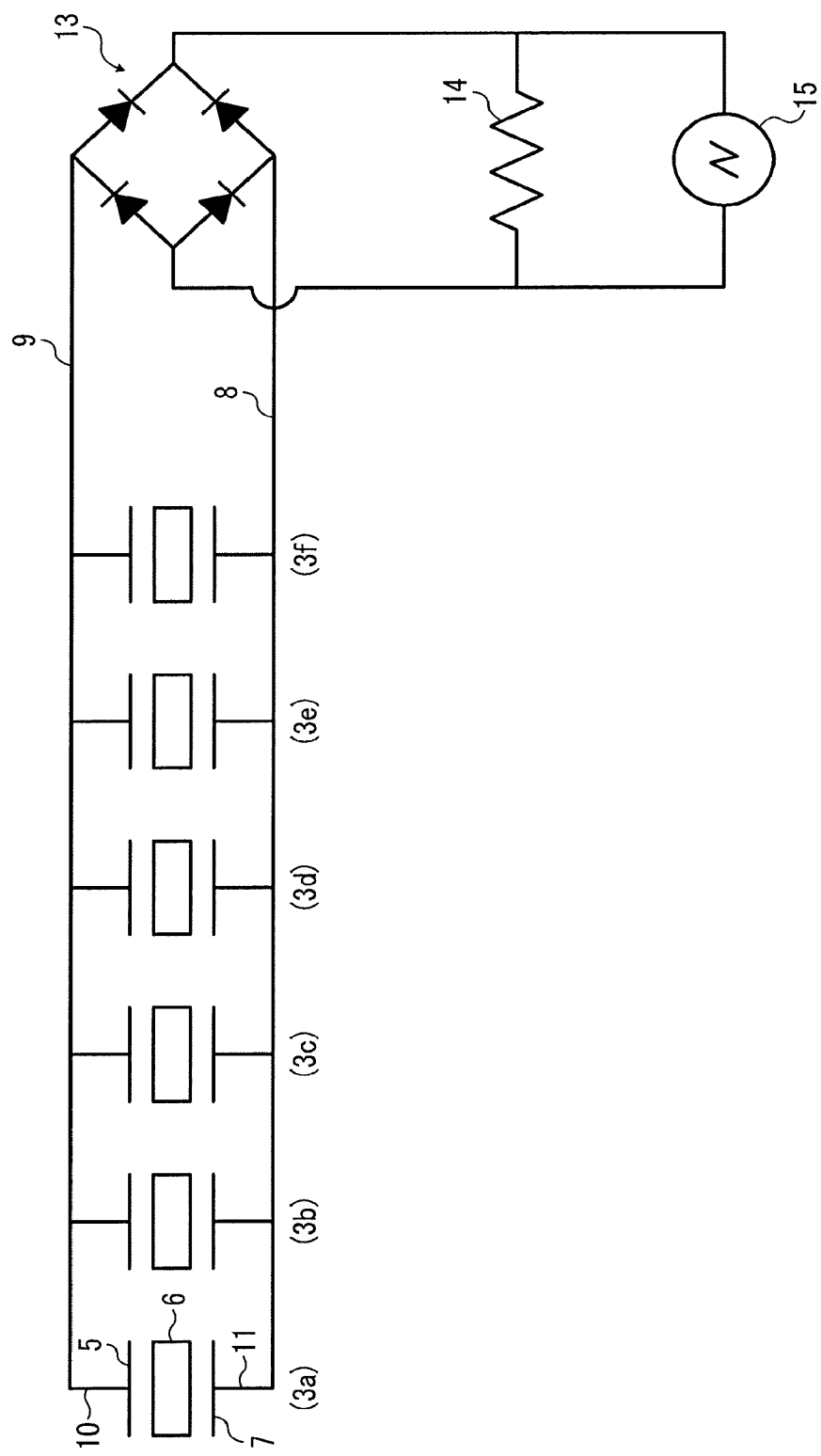
FIG. 10 is a circuit diagram for evaluating the amount of power generated by the power generating element according to the second embodiment of the present invention.

FIG. 10 is an electricity extracting circuit diagram for evaluating the amount of power generated by the power generating element 1B according to the second embodiment of the present invention. The mainstream lead wires 8 and 9 are connected to a diode bridge 13 serving as a rectifier circuit. The diode bridge 13 is connected to an oscilloscope 15 via a resistance 14.

Figure 11:
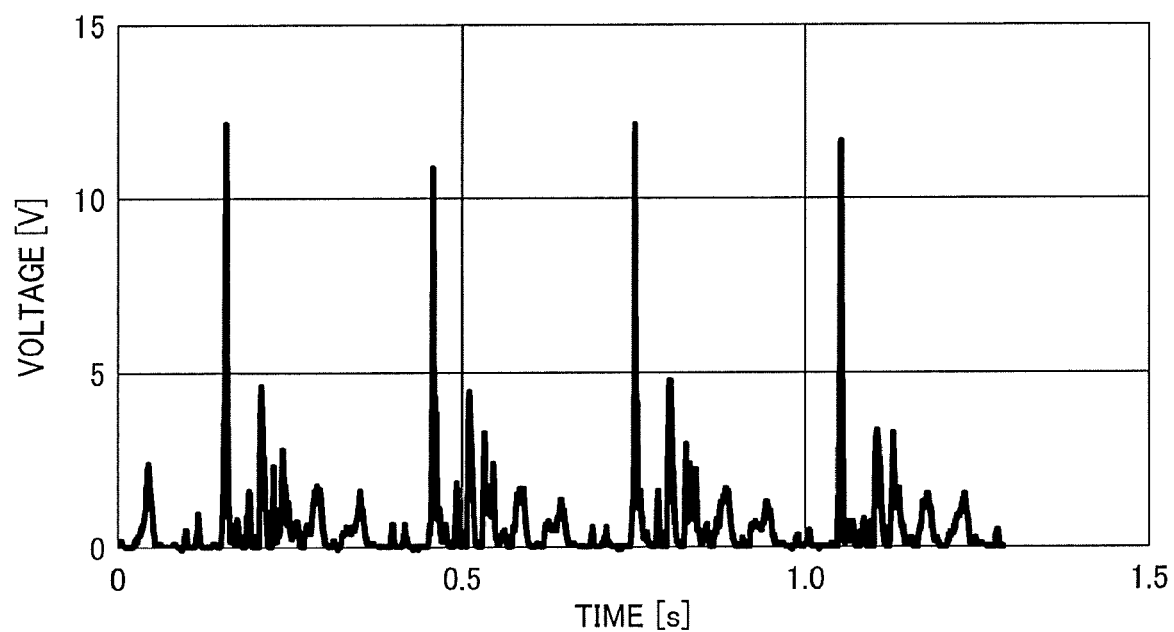
FIG. 11 is a graph showing the amount of power generated by the power generating element according to the second embodiment of the present invention.

FIG. 11 is a graph showing an output voltage measured when the power generating element 1B was flapped with a human hand.

It is clear from FIG. 11 that the output voltage has a VPP value of about 13V (under a probe resistance of 1 MΩ and an attenuation factor of 1:1), which lighted up 50 green LEDs connected in series.

From this result, it is assumed that peeling charge sufficiently occurred in the power generating element 1B to generate a large amount of power.

Figure 12:
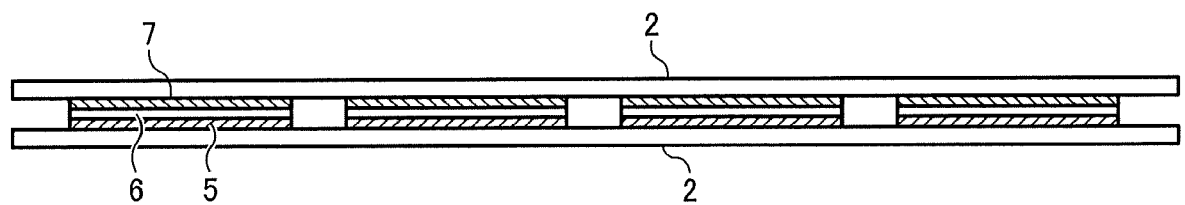
FIG. 12 is a side view of a related-art power generating element.

For comparison, a related-art power generating element illustrated in FIG. 12 was also subjected to the same evaluation as above. In this related-art power generating element, the upper electrode 7 and the intermediate layer 6 are bonded to each other so as not to be separated from each other even when the element is deformed. The amount of power generated by this related-art power generating element was only about 4 V.

A third embodiment of the present invention is described below with reference to FIGS. 13A-13B and 14A-14B.

Figure 13A:
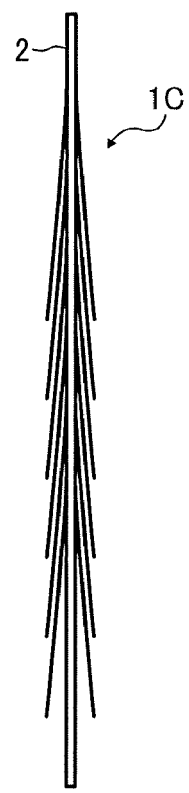
FIGS. 13A and 13B are side views of a power generating element according to a third embodiment of the present invention, in an undeformed state and a deformed state, respectively.
Figure 13B:
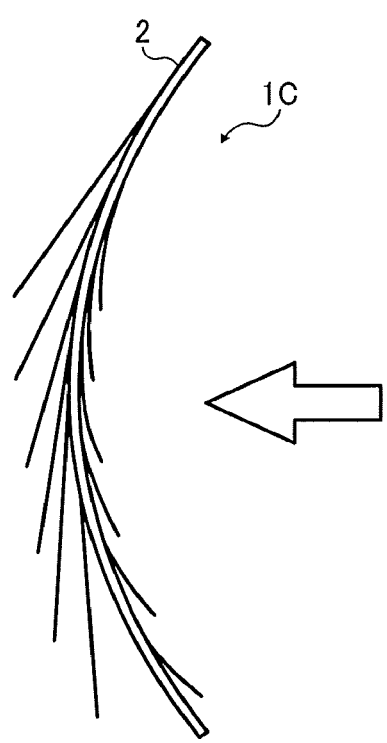

Referring to FIG. 13A, a power generating element 1C includes a substrate 2 and the above-described power generating configurations disposed on both surfaces of the substrate 2. Referring to FIG. 13B, when the substrate 2 is bent by an external force (e.g., wind), the insulating members 3 disposed on the convexed side of the substrate 2 rise up and cause peeling charging to generate power, while the insulating members 3 disposed on the opposite concaved side of the substrate 2 press-contact with and displace from each other to generate power.

Figure 14A:
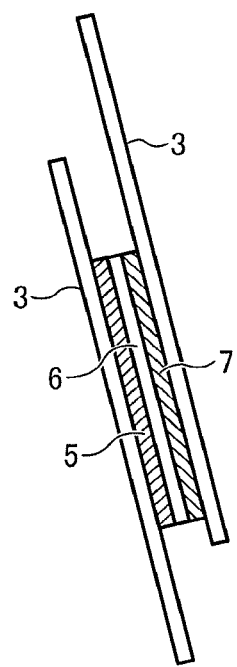
FIGS. 14A and 14B are partial magnified views of FIGS. 13A and 13B, respectively.
Figure 14B:
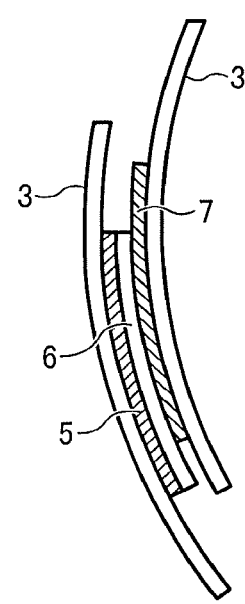

Specifically, when the substrate 2 is not bent, as illustrated in FIG. 14A, the intermediate layer 6 and the upper electrode 7 are in contact with or close to each other. By contrast, when the substrate 2 is bent, as illustrated in FIG. 14B, the intermediate layer 6 and the upper electrode 7 press-contact with each other, while displacing from each other in some situations, in the insulating members 3 disposed on the concaved side of the substrate 2.

Thus, triboelectric charging or contact charging occurs to store a charge, and a change in capacitance is generated between the intermediate layer 6 and the upper electrode 7 to generate power.

A change in capacitance is also generated when the substrate 2 returns to a previous state.

The power generating element 1C according to the third embodiment can generate a larger amount of power than the power generating element 1B according to the second embodiment.

A fourth embodiment of the present invention is described below with reference to FIGS. 15A and 15B.

Figure 15A:
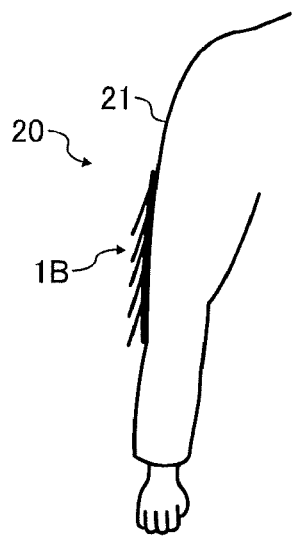
FIGS. 15A and 15B are illustrations of a power generating device according to a fourth embodiment of the present invention, in an undeformed state and a deformed state, respectively.
Figure 15B:
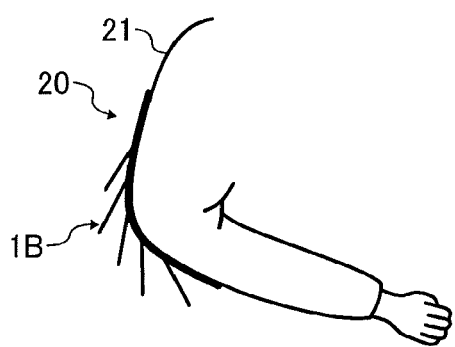

Referring to FIG. 15A, a power generating device 20 includes the power generating element 1B and a garment 21. The garment 21 serves as an element driver that causes a deformation to the substrate 2 of the power generating element 1B as a garment wearer (moving body) moves.

The power generating element 1B is secured to an elbow part of the garment 21, or alternatively, detachably attached thereto with a hook-and-loop fastener. When the garment wearer's arm is bent as illustrated in FIG. 15B, the substrate 2 of the power generating element 1B is bent, which causes the power generating element 1B to generate power in the above-described manner.

When mounted on the garment 21, the power generating element 1B may be used as, for example, a power source for LEDs (light-emitting diodes) attached to the garment 21 or for a wearable terminal put on the garment wearer. The power generating element 1B may be attached to any part of the garment 21, other than the elbow part, that undergoes a deformation as the garment wearer moves.

Alternatively, the power generating element 1B may be directly mounted on a human body. The moving body is not limited to a human body. All non-oscillatory bending movements caused in the environment can be used for generating power.

Although human body movements are generally low-frequency movements, the speed and displacement of which are small and large, respectively, human body movements can generate a large amount of power when applied to the above-described power generating configuration in which the insulating members 3 are separated from or pressed against each other.

A fifth embodiment of the present invention is described below with reference to FIGS. 16A-16B and 17.

Figure 16A:
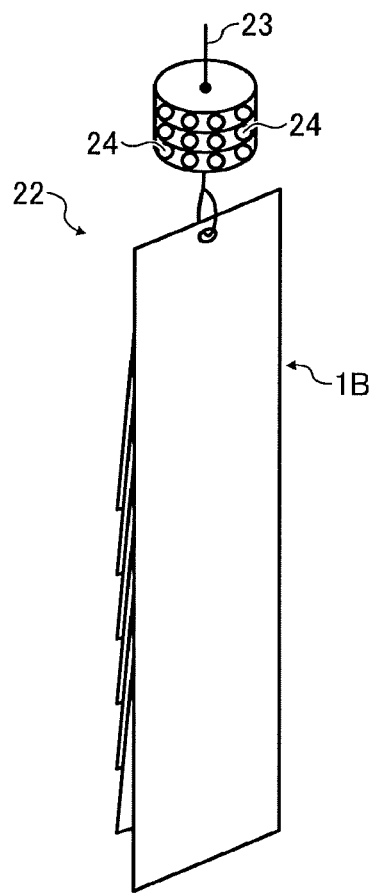
FIGS. 16A and 16B are illustrations of a power generating device according to a fifth embodiment of the present invention, in an undeformed state and a deformed state, respectively.

Referring to FIG. 16A, a power generating device 22 includes the power generating element 1B and a suspension member 23 suspending the power generating element 1B. Multiple LEDs 24 are attached to the suspension member 23. Referring to FIG. 17, a charge generated in the power generating device 22 is introduced to the diode bridge 13, serving as a rectifier, via the mainstream lead wires 8 and 9 and wires 25. The charge is converted into a current flowing in a specific direction in the diode bridge 13, and the multiple LEDs 24 are lighted up by the current.

Figure 17:
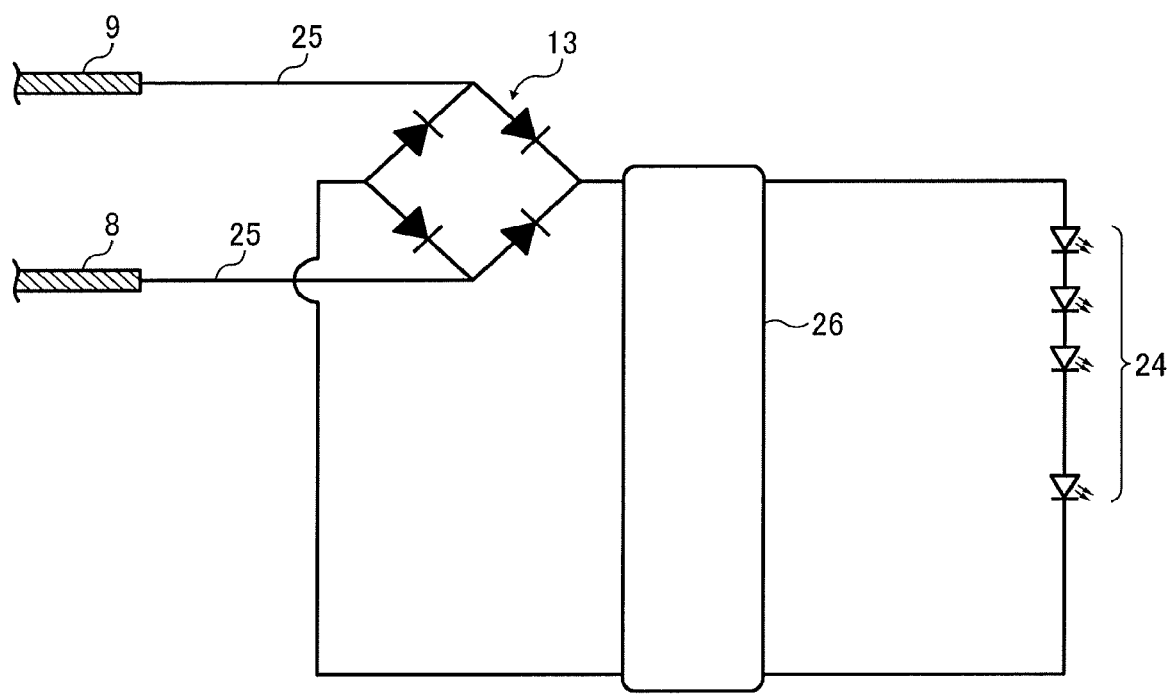
FIG. 17 is a circuit diagram for evaluating the amount of power generated by the power generating element according to the fifth embodiment of the present invention.

As illustrated in FIG. 17, an LED driving circuit 26 for controlling lighting or blinking of the LEDs 24 may be added to the circuit.

Figure 16B:
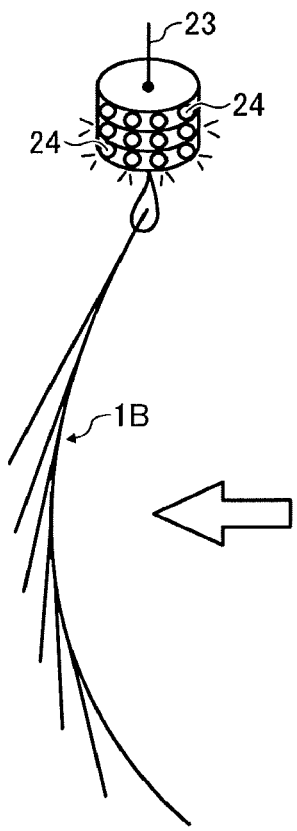

Referring to FIG. 16B, as the substrate 2 is bent or deformed by wind, power is generated and the LEDs 24 are lighted up by the generated power.

The LEDs 24 may consists of multiple groups, for example, an upper group, a middle group, and a lower group respectively including red LEDs, green LEDs, and blue LEDs. In this embodiment, which color LEDs are lighted up may be determined depending on wind strength.

In the power generating device 22, the power generating element 1B may be replaced with the power generating element 1C that includes the power generating configurations on both sides of the substrate 2.

In the above-described embodiments, the intermediate layer 6 includes a silicone rubber that has been subjected to a surface modification treatment and an inactivation treatment. Owing to the surface modification treatment, both sides of the intermediate layer 6, respectively facing the lower electrode 5 and the upper electrode 7, deform to different degrees of deformation when the same deformation imparting force is applied thereto. In other words, one side of the intermediate layer 6 is different from the other side thereof in terms of hardness. This property improves power generating efficiency of the power generating device.

Materials used for the power generating elements and devices in accordance with some embodiments of the present invention are described in detail below.

First Electrode and Second Electrode

The lower electrode 5 and the upper electrode 7 (hereinafter "the first electrode and the second electrode") are not limited in material, shape, size, and structure.

The first electrode and the second electrode are either common or different in material, shape, size, and/or structure. Preferably, the first electrode and the second electrode are common in these properties.

Specific examples of materials used for the first electrode and the second electrode include, but are not limited to, metals, carbon-based conductive materials, and conductive rubber compositions.

Specific examples of the metals include, but are not limited to, gold, silver, copper, aluminum, stainless steel, tantalum, nickel, and phosphor bronze. Specific examples of the carbon-based conductive materials include, carbon nanotube, carbon fibers, and graphite. Specific examples of the conductive rubber compositions include, but are not limited to, a composition including a conductive filler and a rubber.

Specific examples of the conductive filler include, but are not limited to, carbon materials (e.g., Ketjen black, acetylene black, graphite, carbon fiber (CF), carbon nanofiber (CNF), carbon nanotube (CNT), graphene), metal fillers (e.g., gold, silver, platinum, copper, aluminum, nickel), conductive polymeric materials (e.g., derivatives of polythiophene, polyacetylene, polyaniline, polypyrrole, polyparaphenylene, or polyparaphenylene vinylene, to which a dopant, such as anion and cation, may be added), and ionic liquids. Each of these materials can be used alone or in combination with others.

Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, natural rubber (latex), ethylene propylene rubber, nitrile rubber, and fluorine rubber. Each of these materials can be used alone or in combination with others.

The first electrode and the second electrode may be in the form of a thin film. The first electrode and the second electrode may be made of woven fabric, non-woven fabric, knit fabric, mesh, sponge, or non-woven fabric formed by layering fibrous carbon materials.

Preferably, the first electrode and the second electrode have an average thickness in the range of from 0.01 µm to 1 mm, more preferably from 0.1 to 500 µm, from the aspect of conductivity and flexibility. When the average thickness is 0.01 µm or more, mechanical strength becomes appropriate and conductivity improves. When the average thickness is 1 mm or less, the element becomes deformable, thus providing good power generation performance.

Intermediate Layer

The intermediate layer 6 has flexibility.

The intermediate layer 6 satisfies at least one of the following conditions (1) and (2).

Condition (1): When a pressure is applied to the intermediate layer 6 from a direction perpendicular to the plane of the intermediate layer 6, the amount of deformation of a first side of the intermediate layer 6 facing the first electrode and that of a second side of the intermediate layer 6 facing the second electrode are different.

Condition (2): The universal hardness (H1) of the first side of the intermediate layer 6 facing the first electrode and the universal hardness (H2) of the second side of the intermediate layer 6 facing the second electrode are different, when the indentation depth is 10 µm.

As the amount of deformation or the hardness is different between both sides of the intermediate layer 6, a large amount of power can be generated.

Here, the amount of deformation is defined as the maximum indentation depth of an indenter, when the indenter is pressed against the intermediate layer 6 under the following conditions.

Measurement Conditions

Measuring instrument: Microhardness tester WIN-HUD available from Fischer

Indenter: Quadrangular diamond indenter having a facing angle of 136°

Initial load: 0.02 mN

Maximum load: 1 mN

Load increasing time from initial load to maximum load: 10 seconds

The universal hardness is measured under the following conditions.

Measurement Conditions

Measuring instrument: Microhardness tester WIN-HUD available from Fischer

Indenter: Quadrangular diamond indenter having a facing angle of 136°

Indentation depth: 10 µm

Initial load: 0.02 mN

Maximum load: 100 mN

Load increasing time from initial load to maximum load: 50 seconds

The ratio (H1/H2) of the universal hardness (H1) to the universal hardness (H2) is preferably 1.01 or more, more preferably 1.07 or more, and most preferably 1.13 or more. The upper limit of the ratio (H1/H2) is variable according to the degree of flexibility required by the use condition and/or the load applied in the use condition. However, the ratio (H1/H2) is preferably 1.70 or less. The universal hardness (H1) is a hardness of a relatively hard surface. The universal hardness (H2) is a hardness of a relatively soft surface.

Specific examples of materials used for the intermediate layer 6 include, but are not limited to, rubbers and rubber compositions. Specific examples of the rubbers include, but are not limited to, silicone rubber, fluorosilicone rubber, acrylic rubber, chloroprene rubber, natural rubber (latex), urethane rubber, fluorine rubber, and ethylene propylene rubber. Each of these materials can be used alone or in combination with others. Among these rubbers, silicone rubber is preferable.

The silicone rubber is not limited in structure so long as organosiloxane bonds are included. Specific examples of the silicone rubber include, but are not limited to, dimethyl silicone rubber, methyl phenyl silicone rubber, modified (e.g., acrylic-modified, alkyd-modified, ester-modified, epoxy-modified) silicone rubber. Each of these materials can be used alone or in combination with others.

Specific examples of the rubber compositions include, but are not limited to, a composition including a filler and at least one of the above-described rubbers. Among these rubber compositions, a silicone rubber composition including the above-described silicone rubbers is preferable.

The filler may be either an organic filler, an inorganic filler, or an organic-inorganic composite filler. Any organic compounds can be used as the organic filler. Specific examples of the organic filler include, but are not limited to, fine particles of acrylic resin, melamine resin, or fluororesin (e.g., polytetrafluoroethylene), silicone powder (e.g., silicone resin powder, silicone rubber powder, silicone composite powder), rubber powder, wood powder, pulp, and starch. Any inorganic compounds can be used as the inorganic filler.

Specific examples of the inorganic filler include, but are not limited to, oxides, hydroxides, carbonates, sulfates, silicates, nitrides, carbons, metals, and other compounds.

Specific examples of the oxides include, but are not limited to, silica, diatom earth, alumina, zinc oxide, titanium oxide, iron oxide, and magnesium oxide.

Specific examples of the hydroxides include, but are not limited to, aluminum hydroxide, calcium hydroxide, and magnesium hydroxide.

Specific examples of the carbonates include, but are not limited to, calcium carbonate, magnesium carbonate, barium carbonate, and hydrotalcite.

Specific examples of the sulfates include, but are not limited to, aluminum sulfate, calcium sulfate, and barium sulfate.

Specific examples of the silicates include, but are not limited to, calcium silicate (e.g., wollastonite, xonotlite), zirconia silicate, kaolin, talc, mica, zeolite, pearlite, bentonite, montmorillonite, sericite, activated clay, glass, and hollow glass beads.

Specific examples of the nitrides include, but are not limited to, aluminum nitride, silicon nitride, and boron nitride.

Specific examples of the carbons include, but are not limited to, Ketjen black, acetylene black, graphite, carbon fiber, carbon nanofiber, carbon nanotube, fullerene (and derivatives thereof), and graphene.

Specific examples of the metals include, but are not limited to, gold, silver, platinum, copper, iron, aluminum, and nickel.

Specific examples of the other compounds include, but are not limited to, potassium titanate, barium titanate, strontium titanate, lead zirconate titanate, silicon carbide, and molybdenum sulfide. The inorganic filler may be surface-treated.

As the organic-inorganic composite filler, a compound in which an organic compound and an inorganic compound are combined on the molecular level may be used.

Specific examples of the organic-inorganic composite filler include, but are not limited to, silica-acrylic composite particles and silsesquioxane.

The filler preferably has an average particle diameter in the range of from 0.01 to 30 μm, more preferably from 0.1 to 10 μm. When the average particle diameter is 0.01 μm or more, power generation performance may be improved. When the average particle diameter is 30 μm or less, the intermediate layer 6 becomes deformable, thus improving power generation performance.

The average particle diameter can be measured by a known particle size distribution analyzer, such as MICROTRACK HRA (available from Nikkiso Co., Ltd.), by a known method.

The content of the filler in the rubber composition is preferably in the range of from 0.1 to 100 parts by mass, more preferably from 1 to 50 parts by mass, based on 100 parts by mass of the rubber. When the content is 0.1 parts by mass or more, power generation performance may be improved. When the content is 100 parts by mass or less, the intermediate layer 6 becomes deformable, thus improving power generation performance.

The rubber composition may further include other components, such as an additive. The contents of the other components may be appropriately determined so long as the effect of the present invention is not damaged.

Specific examples of the additive include, but are not limited to, a cross-linker, a deterioration preventer, a heat resistant agent, and a colorant.

Materials used for the intermediate layer 6 may be prepared by any known method. For example, the rubber composition may be prepared by mixing the rubber, the filler, and other optional components, and kneading the mixture.

The intermediate layer 6 may be formed by any known method. For example, a thin layer of the rubber composition may be formed by hardening the rubber composition, coated on a substrate by means of blade coating, die coating, or dip coating, with heat or electron beam.

The intermediate layer 6 preferably has an average thickness in the range of from 1 μm to 10 mm, more preferably from 20 μm to 1 mm, from the aspect of deformation following property. When the average thickness is within the above preferable range, the intermediate layer 6 can exhibit sufficient film formation property without inhibiting deformation property, thus providing good power generation performance.

Preferably, the intermediate layer 6 has insulation property. More specifically, the intermediate layer 6 preferably has a volume resistivity of $10^8$ Ω cm or more, more preferably $10^{10}$ Ω cm or more. The intermediate layer 6 may have a multi-layered structure.

Surface Modification Treatment and Inactivation Treatment

As methods for making both sides of the intermediate layer 6 different in the amount of deformation or hardness, a surface modification treatment and/or an inactivation treatment may be employed. Such treatments may be performed for either both sides or one side of the intermediate layer 6.

Surface Modification Treatment

Specific examples of the surface modification treatment include, but are not limited to, plasma treatment, corona discharge treatment, electron irradiation treatment, ultraviolet irradiation treatment, ozone treatment, and radiation (e.g., X-ray, α-ray, β-ray, γ-ray, neutron ray) irradiation treatment. From the aspect of processing speed, plasma treatment, corona discharge treatment, and electron irradiation treatment are preferable. The surface modification treatment is not limited to any particular treatment so long as a certain degree of irradiation energy is sufficiently provided to modify a material.

Plasma Treatment

Plasma generators for use in the plasma treatment may be of parallel plate type, capacitive coupling type, or inductive coupling type. In addition, atmospheric pressure plasma generators may also be used for the plasma treatment. In particular, a reduced-pressure plasma treatment is preferable from the aspect of durability.

The reaction pressure in the plasma treatment is preferably in the range of from 0.05 to 100 Pa, and more preferably from 1 to 20 Pa.

As the reaction atmosphere in the plasma treatment, inert gas, rare gas, and oxygen gas are suitable. In particular, argon is preferable from the aspect of persistence of the effect.

The reaction atmosphere preferably has an oxygen partial pressure of 5,000 ppm or less. When the reaction atmosphere has an oxygen partial pressure of 5,000 ppm or less, generation of ozone is suppressed and the use of an ozone treatment equipment is reduced.

In the plasma treatment, the amount of irradiation electric energy, defined by the product of output and irradiation time, is preferably in the range of from 5 to 200 Wh, more preferably from 10 to 50 Wh. When the amount of irradiation electric energy is within the above preferable range, the intermediate layer 6 is given a power generation function without degrading durability by excessive irradiation.

Corona Discharge Treatment

In the corona discharge treatment, the amount of applied (accumulated) energy is preferably in the range of from 6 to 300 J/cm², more preferably from 12 to 60 J/cm². When the amount of applied energy is within the above preferable range, the intermediate layer 6 is given a power generation function without degrading durability by excessive irradiation.

Electron Irradiation Treatment

In the electron irradiation treatment, the irradiation amount is preferably 1 kGy or more, and more preferably in the range of from 300 kGy to 10 MGy. When the irradiation amount is within the above preferable range, the intermediate layer 6 is given a power generation function without degrading durability by excessive irradiation.

As the reaction atmosphere in the electron irradiation treatment, an inert gas (e.g., argon gas, neon gas, helium gas, nitrogen gas) having an oxygen partial pressure of 5,000 ppm or less is preferable. When the reaction atmosphere has an oxygen partial pressure of 5,000 ppm or less, generation of ozone is suppressed and the use of an ozone treatment equipment is reduced.

Ultraviolet Irradiation Treatment

In the ultraviolet irradiation treatment, the ultraviolet ray preferably has a wavelength of from 200 to 365 nm, more preferably from 240 to 320 nm.

In the ultraviolet irradiation treatment, the accumulated amount of light is preferably in the range of from 5 to 500 J/cm², more preferably from 50 to 400 J/cm². When the accumulated amount of light is within the above preferable range, the intermediate layer 6 is given a power generation function without degrading durability by excessive irradiation.

As the reaction atmosphere in the ultraviolet irradiation treatment, an inert gas (e.g., argon gas, neon gas, helium gas, nitrogen gas) having an oxygen partial pressure of 5,000 ppm or less is preferable. When the reaction atmosphere has an oxygen partial pressure of 5,000 ppm or less, generation of ozone is suppressed and the use of an ozone treatment equipment is reduced.

There is a conventional technology for improving an interlayer adhesion force by forming active groups by means of excitation or oxidization caused by a plasma treatment, corona discharge treatment, ultraviolet irradiation treatment, or electron irradiation treatment. However, such a technology has a limited application to improvement of interlayer adhesion force. It is known that application of that technology to outermost surface modification treatments causes a significant deterioration in releasability of the outermost surface, which is not preferable. Moreover, in that technology, a reactive active group (e.g., hydroxyl group) is efficiently introduced under an oxygen-rich reaction condition. That conventional technology is essentially different from the surface modification treatments in accordance with some embodiments of the present invention.

The plasma treatment, as an example of the surface modification treatment in accordance with some embodiments of the present invention, is performed under a reduced-pressure environment with a small amount of oxygen. Such a plasma treatment accelerates re-cross-linkage or recombination of the surface and increases the number of Si—O bonds having a high bond energy, improving the durability of the surface.

In addition, since the surface is densified owing to the increased cross linkage density, the releasability of the surface is also improved. Although active groups are formed in part, such active groups are inactivated by a coupling agent or an air drying treatment.

Inactivation Treatment

The surface of the intermediate layer 6 may be subjected to an inactivation treatment using any material.

The inactivation treatment is not limited to any particular process so long as the surface of the intermediate layer 6 is inactivated. For example, the inactivation treatment may include imparting an inactivator to the surface of the intermediate layer 6. Here, inactivation of the intermediate layer 6 refers to a phenomenon in which the nature of the surface of the intermediate layer 6 is changed to have less chemical reactivity. Specifically, the degree of activity of the surface of the intermediate layer 6 is reduced by reacting the surface with an inactivator with active groups (e.g., —OH groups) generated by excitation or oxidization caused by a plasma treatment, corona discharge treatment, ultraviolet irradiation treatment, or electron irradiation treatment.

Specific examples of the inactivator include, but are not limited to, an amorphous resin and a coupling agent. Specific examples of the amorphous resin include, but are not limited to, a resin having a perfluoropolyether structure in its main backbone.

Specific examples of the coupling agent include, but are not limited to, a metal alkoxide, and a solution containing a metal alkoxide.

Specific examples of the metal alkoxide include, but are not limited to, a compound represented by the following formula (1), a partially-hydrolyzed polycondensate thereof having a polymerization degree of about 2 to 10, and a mixture thereof.

$$R^1_{(4-1)}Si(OR^2)_n \quad (1)$$

In the formula (1), each of $R^1$ and $R^2$ independently represents a straight-chain or branched-chain alkyl group having 1 to 10 carbon atoms, an alkyl polyether chain, or an aryl group; and n represents an integer of from 2 to 4.

The inactivation treatment may be performed by, for example, subjecting a precursor (e.g., rubber) of the intermediate layer 6 to the surface modification treatment first, and then coating or impregnating (e.g., by means of dipping) the surface of the precursor of the intermediate layer 6 with an inactivator.

When a silicone rubber is used as the precursor of the intermediate layer 6, the silicone rubber may be subjected to the surface modification treatment first, and then left at rest in the air to be inactivated through air drying.

Preferably, the oxygen concentration profile of the intermediate layer 6 has a local maximum value in the thickness direction. Preferably, the carbon concentration profile of the intermediate layer 6 has a local minimum value in the thickness direction.

Preferably, in the intermediate layer 6, a position which indicates a local maximum value in the oxygen concentration profile is coincident with a position which indicates a local minimum value in the carbon concentration profile.

The oxygen concentration profile and the carbon concentration profile can be determined by X-ray photoelectron spectroscopy (XPS).

Measurement Conditions

Measurement Device: ULVAC-PHI QUANTERA SXM available from ULVAC-PHI, Inc.
Measurement Light Source: Al (mono)
Measurement Output: 100 μm φ, 25.1 W
Measurement Area: 500 μm×300 μm
Pass Energy: 55 eV (narrow scan)
Energy Step: 0.1 eV (narrow scan)
Relative Sensitivity Factor: Relative sensitivity factor of PHI is used
Sputter Source: C60 Cluster ion
Ion Gun Output: 10 kV, 10 nA
Raster Control: (X=0.5, Y=2.0) mm
Sputter Rate: 0.9 nm/min ($SiO_2$ conversion)

XPS analyzes atomic composition and binding state of a target object by capturing electrons which escaped from the target object by the photoelectron effect.

Silicone rubbers have siloxane bonds. The major components of silicone rubbers include Si, O, and C. In a case in which the intermediate layer 6 is formed of a silicone rubber, the atomic composition of the intermediate layer 6 in the depth direction, in other words, the atomic concentration (%) distribution of the major atoms (Si, O, or C) ranging from the surface part to the inner part of the intermediate layer 6, can be determined from a relative peak strength ratio in a wide scan spectrum measured by XPS. One example of the wide scan spectrum is illustrated in FIG. 18.

Figure 18:
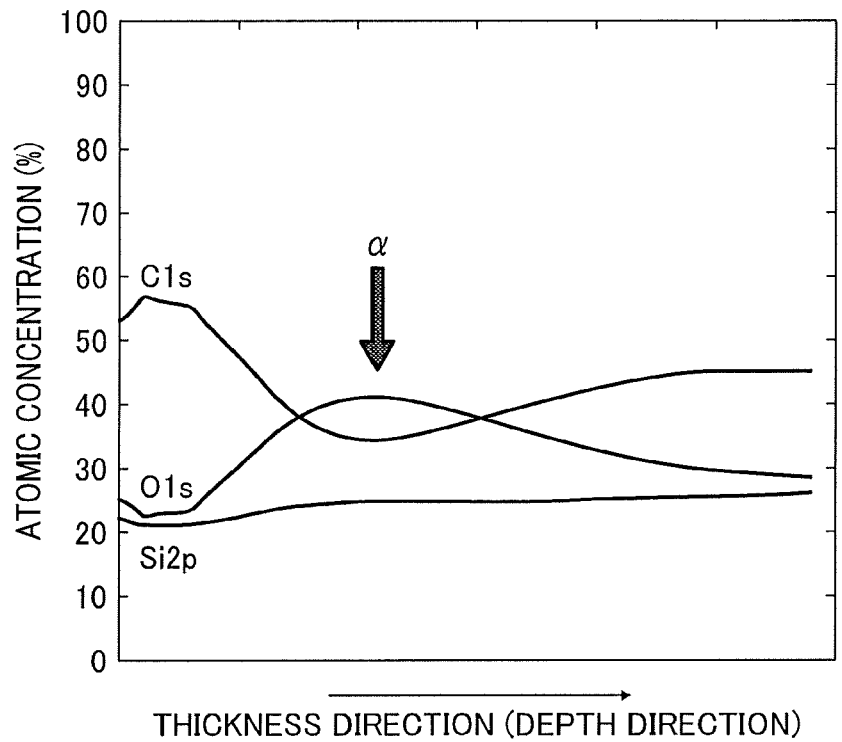
FIG. 18 is an XPS (X-ray photoelectron spectroscopy) chart of a surface-modified inactivated intermediate layer, formed of a silicone rubber, of a power generating device according to an embodiment of the present invention.

The spectrum illustrated in FIG. 18 is measured with one sample of the intermediate layer 6 which is prepared by subjecting a silicone rubber to the above-described plasma treatment (as the surface modification treatment) and the above-described inactivation treatment. In FIG. 18, the horizontal axis represents the analysis depth measured from the surface part toward the inner part, and the vertical axis represents the atomic concentration (%).

In the case of a silicone rubber, elements bound to silicon atoms and the binding state thereof can be determined by measuring the energy of electrons escaped form the Si2p orbit. Specifically, by separating peaks in a narrow scan spectrum of the Si2p orbit, which indicates binding state of Si, a chemical binding state of Si can be determined.

Figure 19:
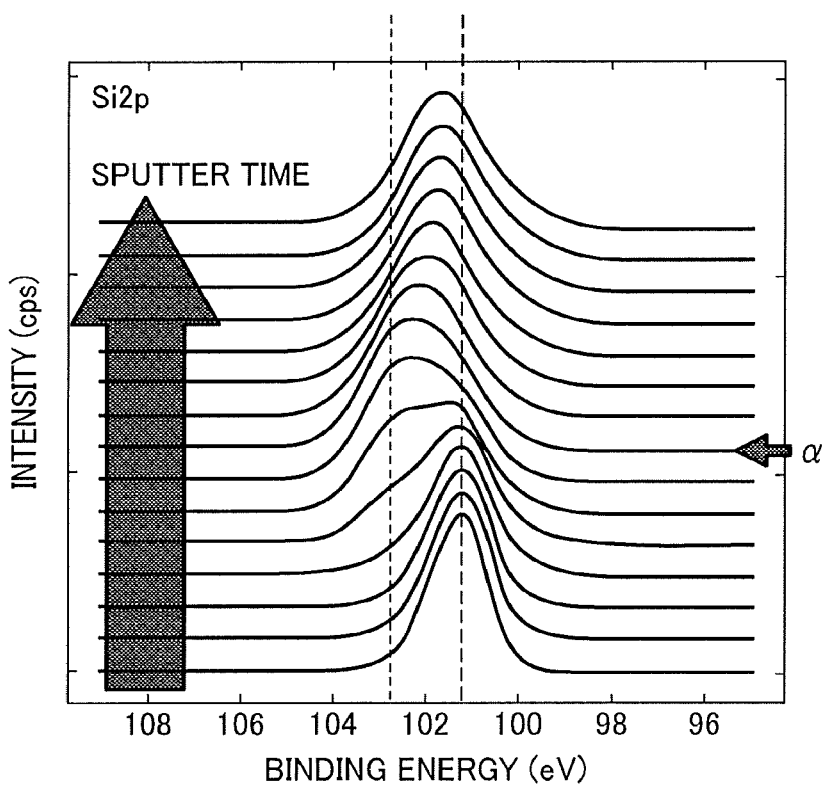
FIG. 19 is a graph showing a variation in the Si2p binding energy of the intermediate layer used to obtain the chart of FIG. 18 in the thickness direction.

The result of peak separation is illustrated in FIG. 19. The graph illustrated in FIG. 19 was measured with the same sample of the intermediate layer 6 used to obtain the chart of FIG. 18. In FIG. 19, the horizontal axis represents binding energy, and the vertical axis represents intensity. Each curve represents a spectrum measured at each depth. A spectrum on a lower side indicates a greater (deeper) measurement depth.

It is generally known that the amount of peak shift depends on the binding state. In the case of the silicone rubber according to the present embodiment, the peak is shifted toward a high-energy side with respect to the Si2p orbit. This indicates that the amount of oxygen atoms bound to Si has been increased.

As the silicone rubber is subjected to the surface modification treatment and the inactivation treatment, the amount of oxygen is increased from the surface part toward the inner part while exhibiting a local maximum value, while the amount of carbon is decreased while exhibiting a local minimum value. As the silicone rubber is further analyzed in the depth direction, the amount of oxygen is decreased and the amount of carbon is increased to have the same atomic composition as an untreated silicone rubber.

The fact that the local maximum value in the oxygen concentration profile is detected at the position a in FIG. 18 is coincident with the fact that the Si2p binding energy is shifted to a high-energy side (as indicated by a in FIG. 19). This indicates that an increase of oxygen atoms is detected from the number of oxygen atoms bound to Si.

Figure 20:
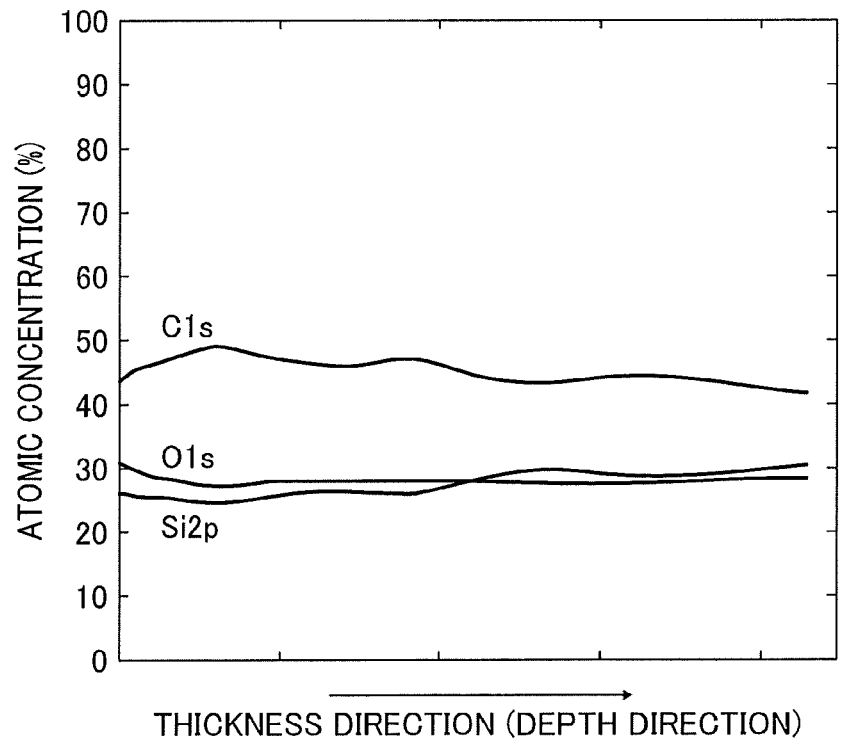
FIG. 20 is an XPS chart of an untreated intermediate layer, formed of a silicone rubber.
Figure 21:
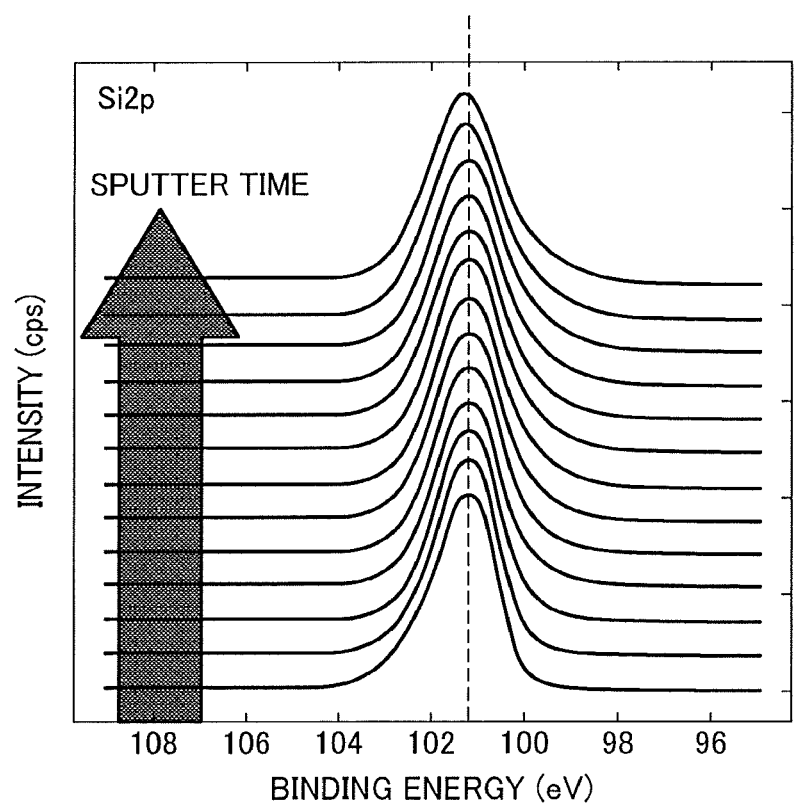
FIG. 21 is a graph showing a variation in the Si2p binding energy of the intermediate layer used to obtain the chart of FIG. 20 in the thickness direction.

FIGS. 20 and 21 present results for an untreated silicone rubber with respect to the same analysis performed to obtain graphs of FIGS. 18 and 19, respectively.

In FIG. 20, no local maximum value is observed in the oxygen concentration profile, and no local minimum value is observed in the carbon concentration profile, in contrast to FIG. 18. In addition, in FIG. 21, the Si2p binding energy is not shifted to a high-energy side. This indicates that the number of oxygen atoms bound to Si has not been changed.

As the surface of the intermediate layer 6 is coated or impregnated (e.g., by means of dipping) with the inactivator (e.g., a coupling agent), the inactivator gradually penetrates the intermediate layer 6. In a case in which the coupling agent is the compound represented by the formula (1), polyorganosiloxane will be distributed within the intermediate layer 6. The concentration distribution of oxygen atoms included in the polyorganosiloxane will exhibit a local maximum value in the depth direction.

As a result, the intermediate layer 6 comes to include polyorganosiloxane containing silicon atoms bound to 3 to 4 oxygen atoms.

The inactivation treatment is not limited to dipping, so long as oxygen atoms included in polyorganosiloxane are distributed such that the concentration distribution thereof exhibits a local maximum value in the depth direction (thickness direction). Specific examples of the inactivation treatment include, but are not limited to, plasma CVD (chemical vapor deposition), PVD (physical vapor deposition), sputtering, vacuum deposition, and combustion chemical vapor deposition.

The intermediate layer 6 need not necessarily have an initial surface potential at rest. The initial surface potential at rest can be measured under the conditions described below. Here, having no initial surface potential refers to having an initial surface potential of ±10 V or less, when measured under the following conditions.

Measurement Conditions

Pretreatment: Left at rest in an atmosphere having a temperature of 30° C. and a relative humidity of 40% for 24 hours and subjected to a neutralization for 60 seconds (using an instrument SJ-F300 available from Keyence Corporation).

Instrument: Treck Model 344
Measurement Probe: 6000B-7C
Measurement Distance: 2 mm
Measurement Spot Diameter: 10 mm Within the element according to the present embodiment, a bias in capacitance is caused upon a charging, the mechanism of which is similar to triboelectric charging, and a generation of surface potential difference due to inner charge retention, according to the difference in deformation amount between both sides of the intermediate layer 6 that is caused by the difference in hardness therebetween. It is considered that such a bias in capacitance causes charge transfer and further causes power generation.

Preferably, a space is provided between the intermediate layer 6 and at least one of the first electrode and the second electrode, to increase the amount of power generation.

For example, such a space can be provided by disposing a spacer between the intermediate layer 6 and at least one of the first electrode and the second electrode.

The spacer is not limited in material, configuration, shape, and size. Specific examples of materials used for the spacer include, but are not limited to, polymeric materials, rubbers, metals, conductive polymeric materials, and conductive rubber compositions.

Specific examples of the polymeric materials include, but are not limited to, polyethylene, polypropylene, polyethylene terephthalate, polyvinyl chloride, polyimide resin, fluororesin, and acrylic resin. Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, and natural rubber (latex).

Specific examples of the metals include, but are not limited to, gold, silver, copper, aluminum, stainless steel, tantalum, nickel, and phosphor bronze. Specific examples of the conductive polymeric materials include, but are not limited to, polythiophene, polyacetylene, and polyaniline. Specific examples of the conductive rubber compositions include, but are not limited to, a composition including a conductive filler and a rubber. Specific examples of the conductive filler include, but are not limited to, carbon materials (e.g., Ketjen black, acetylene black, graphite, carbon fiber, carbon nanofiber, carbon nanotube, graphene), metal fillers (e.g., gold, silver, platinum, copper, iron, aluminum, nickel), conductive polymeric materials (e.g., derivatives of polythiophene, polyacetylene, polyaniline, polypyrrole, polyparaphenylene, or polyparaphenylene vinylene, to which a dopant, such as anion and cation, may be added), and ionic liquids.

Specific examples of the rubber include, but are not limited to, silicone rubber, modified silicone rubber, acrylic rubber, chloroprene rubber, polysulfide rubber, urethane rubber, isobutyl rubber, fluorosilicone rubber, ethylene rubber, and natural rubber (latex).

The spacer may be in the form of a sheet, film, woven fabric, non-woven fabric, mesh, or sponge.

The shape, size, thickness, and installation location of the spacer are appropriately determined according to the structure of the element.

Figure 22:
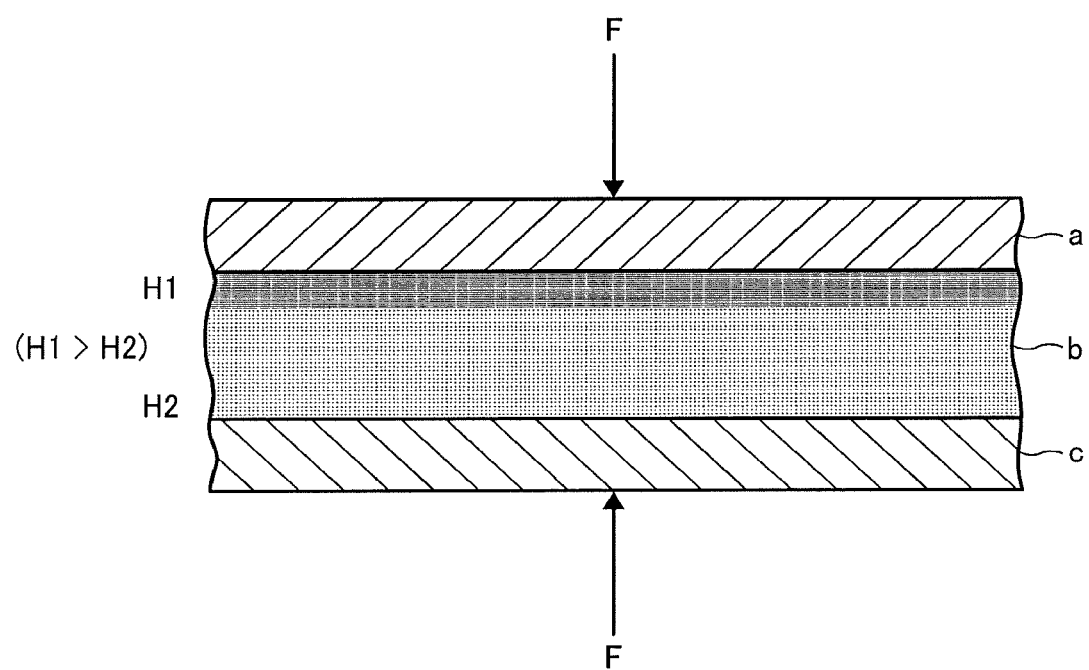
FIG. 22 is a cross-sectional view of an element including a surface-modified inactivated intermediate layer according to an embodiment of the present invention.

In the embodiment illustrated in FIG. 22, the first electrode, the intermediate layer 6, and the second electrode are indicated by symbols a, b, and c, respectively. In a case in which one side of the intermediate layer b which faces the first electrode a is subjected to the surface modification treatment or the inactivation treatment, the universal hardness H1 of that side of the intermediate layer b which faces the first electrode a becomes greater than the universal hardness H2 of the other side of the intermediate layer b which faces the second electrode c.

When a pressing force F is respectively applied to both sides of the intermediate layer b, the degree of deformation of one side of the intermediate layer b facing the first electrode a becomes smaller than that of the other side of the intermediate layer b facing the second electrode c.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A power generating element comprising:
   a pair of electrodes;
   an intermediate layer being insulating, disposed between the electrodes; and
   a substrate being flexible, configured to support the electrodes and the intermediate layer,
   wherein, when the substrate undergoes a deformation, the intermediate layer is separated from or pressed against one of the electrodes to generate an electric charge,
   wherein the intermediate layer includes at least one of a rubber and a rubber composition, and
   wherein a first side of the intermediate layer that is separated from or pressed against the one of the electrode has been subjected to at least one of a surface modification treatment and an inactivation treatment, which causes the first side and a second side opposite the first side to deform to different degrees of deformation when the same deformation imparting force is applied thereto and causes the first side to store charge,
   wherein the intermediate layer includes a silicone rubber,
   wherein the intermediate layer includes an organosiloxane bond, and
   wherein the intermediate layer has an oxygen concentration profile that increases from the first side toward the inside while exhibiting a local maximum value, and a carbon concentration profile that decreases from the first side toward the inside while exhibiting a local minimum value.

2. The power generating element of claim 1, further comprising an insulating member disposed along the substrate, with one end of the insulating member secured to the substrate,
   wherein one of the electrodes is disposed on the insulating member and the other one of the electrodes is disposed on the substrate, with the electrodes facing with each other, and
   wherein the intermediate layer is disposed on any one of the electrodes.

3. A power generating device comprising:
   the power generating element of claim 1; and
   an element driver configured to cause the substrate to deform as a moving body moves.

4. A power generating device comprising:
   the power generating device of claim 1; and
   a suspension member configured to cause the substrate to deform when receiving an external force.

5. The power generating element of claim 1, wherein the substrate is one of polyethylene terephthalate (PET), vinyl chloride, cloth, or paper.

6. The power generating element of claim 1, wherein the substrate undergoes deformation in response to an external force.

7. The power generating element of claim 1, wherein the power generating element is installed in a garment and the garment is configured to deform the substrate in response to movement of the garment.

8. A power generating element comprising:
   a substrate being flexible; and
   a plurality of units each including:
     an insulating member disposed along the substrate, with one end of the insulating member secured to the substrate;
     a first electrode disposed on one surface of the insulating member;
     a second electrode disposed on the other surface of the insulating member; and
     an intermediate layer being insulating, disposed on the first electrode,
   wherein, when the substrate undergoes a deformation, the intermediate layer is separated from or pressed against the second electrode to generate an electric charge, and
   wherein the intermediate layer includes an organosiloxane bond.

9. The power generating element of claim 8, wherein at least two of the units are disposed on one surface of the substrate and the other units are disposed on the other surface of the substrate.

10. The power generating element of claim 8,
    wherein the intermediate layer includes at least one of a rubber and a rubber composition, and
    wherein a first side of the intermediate layer that is separated from or pressed against the second electrode has been subjected to at least one of a surface modification treatment and an inactivation treatment, which causes the first side and a second side opposite the first side to deform to different degrees of deformation when the same deformation imparting force is applied thereto and causes the first side to store charge.

11. The power generating element of claim 10, wherein the intermediate layer includes a silicone rubber.

12. The power generating element of claim 11,
    wherein the intermediate layer has an oxygen concentration profile that increases from the first side toward the inside while exhibiting a local maximum value, and a carbon concentration profile that decreases from the first side toward the inside while exhibiting a local minimum value.

13. A power generating device comprising:
    the power generating element of claim 8; and
    an element driver configured to cause the substrate to deform as a moving body moves.

14. A power generating device comprising:
    the power generating device of claim 8; and
    a suspension member configured to cause the substrate to deform when receiving an external force.

* * * * *